United States Patent [19]

Wittke

[11] 4,155,257
[45] May 22, 1979

[54] TEMPERATURE COMPENSATED VIBRATING BEAM ACCELEROMETER

[75] Inventor: Ernest C. Wittke, Baldwin, N.Y.

[73] Assignee: The Singer Company, Little Falls, N.J.

[21] Appl. No.: 799,177

[22] Filed: May 23, 1977

[51] Int. Cl.² ............................................. G01P 15/10
[52] U.S. Cl. ................................... 73/497; 73/517 R; 73/DIG. 1
[58] Field of Search ............ 73/497, 517 AV, DIG. 1

[56] References Cited
U.S. PATENT DOCUMENTS

| 2,725,492 | 11/1955 | Allan | 73/517 AV X |
| 3,071,974 | 1/1963 | Peterson | 73/497 |
| 3,124,961 | 3/1964 | Bedford | 73/517 AV X |
| 3,153,351 | 10/1964 | Holmes | 73/497 |

Primary Examiner—James J. Gill
Attorney, Agent, or Firm—L. A. Wright; T. W. Kennedy

[57] ABSTRACT

A temperature compensation mechanism for a vibrating beam accelerometer comprising first and second bridge circuits. A quadrature signal is applied to the first bridge circuit containing the quartz crystal which pulls the resonant frequency of the quartz oscillator up or down depending upon the frequency shift caused by temperature variations.

7 Claims, 6 Drawing Figures

PRIOR ART

INPUT AXIS

ALL FREQUENCIES

RESONANCE FOR PRESENT DESIGN

TEMPERATURE COMPENSATION LOWERING FREQUENCY

TEMPERATURE COMPENSATION RAISING FREQUENCY

TEMPERATURE COMPENSATED VIBRATING BEAM ACCELEROMETER

This invention is related to force transducers. More particularly, this invention relates to a temperature compensated vibrating beam accelerometer.

BACKGROUND OF THE INVENTION

As taught in U.S. Pat. No. 3,470,400, to Leon Weisbord and in U.S. Pat. No. 3,479,536 to Frank G. Norris, the vibrating beam accelerometer comprises a thin elongated piezoelectric vibrating beam member mounted to receive compressive tensile forces along its length. The force applied to the beam affects its natural frequency of vibration. The beam is driven by electric fields acting transversely of the beam by means of longitudinally spaced electrodes along the length of the beam. The change in the natural frequency of vibration is detected by appropriate circuitry which derives information therefrom to determine the acceleration on the device.

In the vibrating beam accelerometer of the prior art there is a problem of maintaining the stability of the instrument (e.g. bias and scale factor) because of unwanted temperature variations. In order to achieve stable bias, scale factor and other characteristics, it was necessary in the prior art to maintain a precise temperature control and an extremely low and matched temperature coefficient for the resonant frequency of the beam pairs. These requirements necessitate the use of extreme thermal shielding and equalization, two stage temperature control, and also cause the instrument to be subject to the differential heating effects caused by nuclear radiation. In addition, it is impossible to trim bias and thermal match the instrument once it is assembled.

BRIEF DESCRIPTION OF THE INVENTION

The present invention utilizes the frequency shift characteristics of the vibrating beam accelerometer caused by temperature changes. In other words, the invention makes use of the fact that the frequency shifts caused by temperature uncertainties are smaller than the bandwidth of the beam as represented by its "Q". This means that, by applying quadrature signals of appropriate amplitude to a first bridge circuit comprising the beam oscillator and a variable resistor in the first leg and temperature sensor and a reference resistor in the second leg, the resonant frequency may be "pulled" either upwards or downwards by a desired amount. A second bridge circuit comprising an RC network is designed to generate a temperature coefficient signal which is applied to the input circuits of the first bridge circuit to compensate for temperature variations.

Accordingly, it is an object of this invention to provide a vibrating beam accelerometer having means to provide automatic frequency stabilization to compensate for temperature variations.

These and other objects, features and advantages of the present invention will become more apparent from the following description taken in conjunction with the accompanying drawings wherein.

Figure 1:
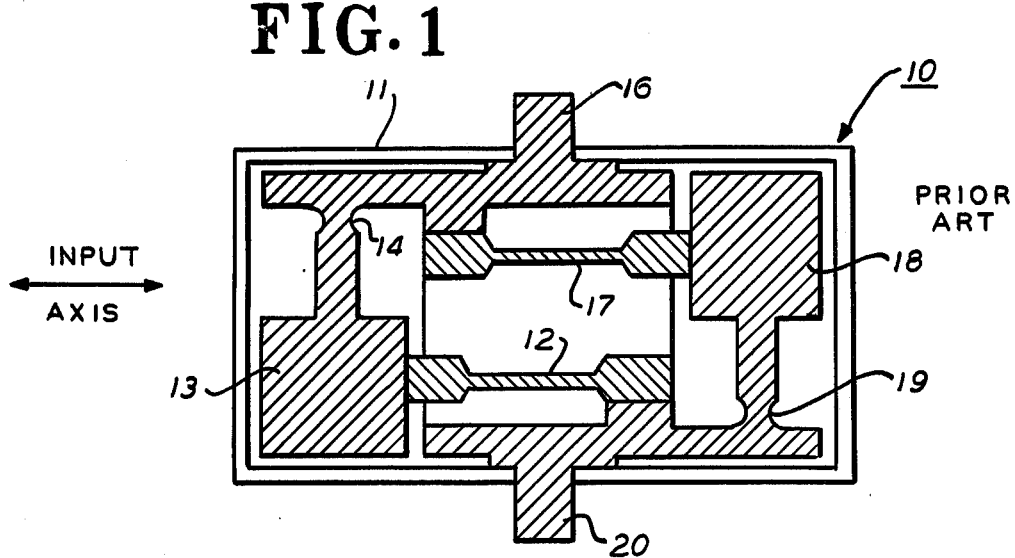
FIG. 1 is a schematic representation of a prior art vibrating beam accelerometer which does not provide temperature compensation in the manner of the invention.

Referring to FIG. 1, there is shown a prior art vibrating beam accelerometer 10 which does not provide automatic temperature compensation to correct for frequency changes. The instrument is housed in a vacuum enclosure 11. Within the enclosure 11, there are two independent vibrating beam transducers 12 and 17 mounted in opposition to each other to achieve symmetry and to permit cancellation of first order errors. A first section comprises crystal beam 12, pendulous mass 13 supported for movement about flexure hinge 14 which in turn is connected to a mounting surface 16. A second section comprises crystal beam 17, pendulous mass 18 supported for movement about flexure hinge 19 which in turn is connected to mounting surface 20. Each pendulous mass is driven by its related quartz crystal beam which is attached to the mass and perpendicular to the pendulum rod axis.

The opposite sides of quartz crystal beams 12 and 17 are plated with an electrically conductive coating (not shown) and are excited by an A-C voltage. The piezoelectric nature of quartz causes it to deflect as a beam under the influence of the applied voltage. At the resonant frequency of the beam as an end supported beam, the electrical impedance between the coated surfaces falls sharply, allowing the beam to be used as one leg of a frequency sensing electrical bridge, the output of which is the input signal to the amplifier driving the bridge, causing the beam-amplifier system to oscillate at the beam resonant frequency.

Applying acceleration to the pendulous masses 13 and 18 along the beam axis causes the resonant frequency to increase (under tension) or decrease (under compression). Since the two sections of the accelerometer are mounted in opposite directions, acceleration causes one beam to be under compression and the other beam to be under tension resulting in a decrease in frequency of one oscillator and an increase in frequency of the other oscillator. The difference in the frequency of the two oscillators is a measure of the applied acceleration.

Figure 2A:
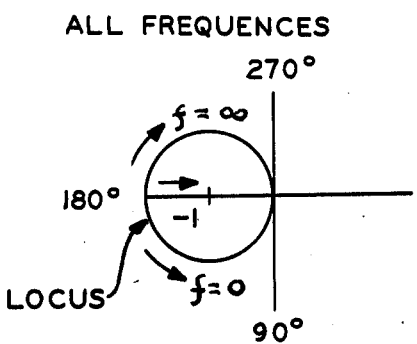
FIGS. 2a and 2b show a Nyquist diagram of the prior art quartz crystal vibrating beam oscillator.
Figure 2B:
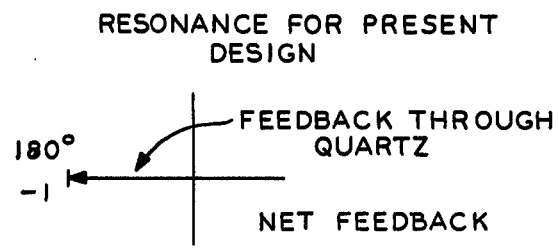
Figure 3A:
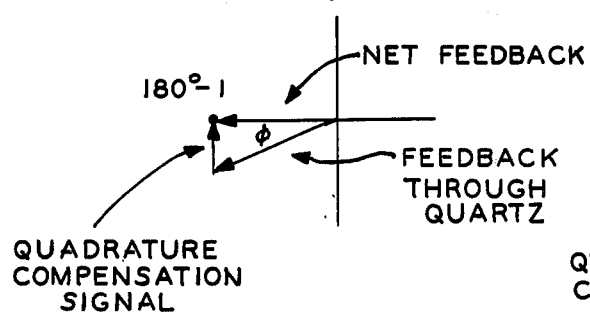
FIGS. 3a and 3b show a Nyquist diagram of the quartz crystal vibrating beam accleerometer of the present invention.
Figure 3B:
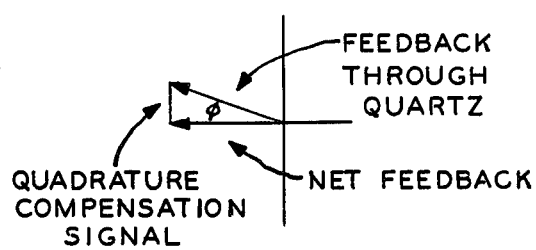

Referring to FIGS. 2a, 2b, 3a and 3b, the present invention makes use of the fact that the frequency shifts caused by temperature uncertainties, etc., are smaller than the bandwidth of the beam as represented by its "Q". This means that, by applying quadrature signals of appropriate amplitude to the bridge circuitry of the oscillator, the resonant frequency may be pulled either upwards or downwards by a desired amount. In an oscillator, resonance occurs at a frequency at which the loop gain is unity and the loop phase is 180°. In the conventional quartz crystal oscillator, the Nyquist diagram, as shown in FIGS. 2a and 2b, shows oscillation at a frequency where the feedback signal through the quartz rod to the amplifier is 180°. When a quadrature signal is added to the signal through the quartz beam to form feedback signal (shown in FIGS. 3a and 3b) the frequency of oscillation readjusts to produce other than 180° of phase shift through the quartz beam so as to allow the feedback signal to be 180° out-of-phase.

Conceptually, the quadrature signal can be generated by two more legs on the bridge. One leg would consist of a film of pure metal deposited on the surface of the quartz beam to act as a temperature sensing resistor by virtue of its 0.35%/° C. inherent temperature coefficient. The other leg of the bridge would consist of a zero temperature coefficient resistor as a reference and located in the temperature controlled environment. The output of this bridge branch is compared with the reference branch output, amplified, shifted in phase by 90° and applied to the input of the oscillator amplifier in parallel with the in-phase signal from the quartz leg of the bridge. As the temperature of the quartz rod changes, the signal generated by the temperatures sensing leg changes from a maximum in-phase value to a maximum out-of-phase value. After amplification and a 90° phase shift, the signal is added to the signal from the main oscillator bridge so as to pull the oscillator upward or downward in frequency. In order for the approach to be effective, it is necessary only that the temperature coefficient of the beam be of the same polarity throughout the adjustment temperature range.

Figure 4:
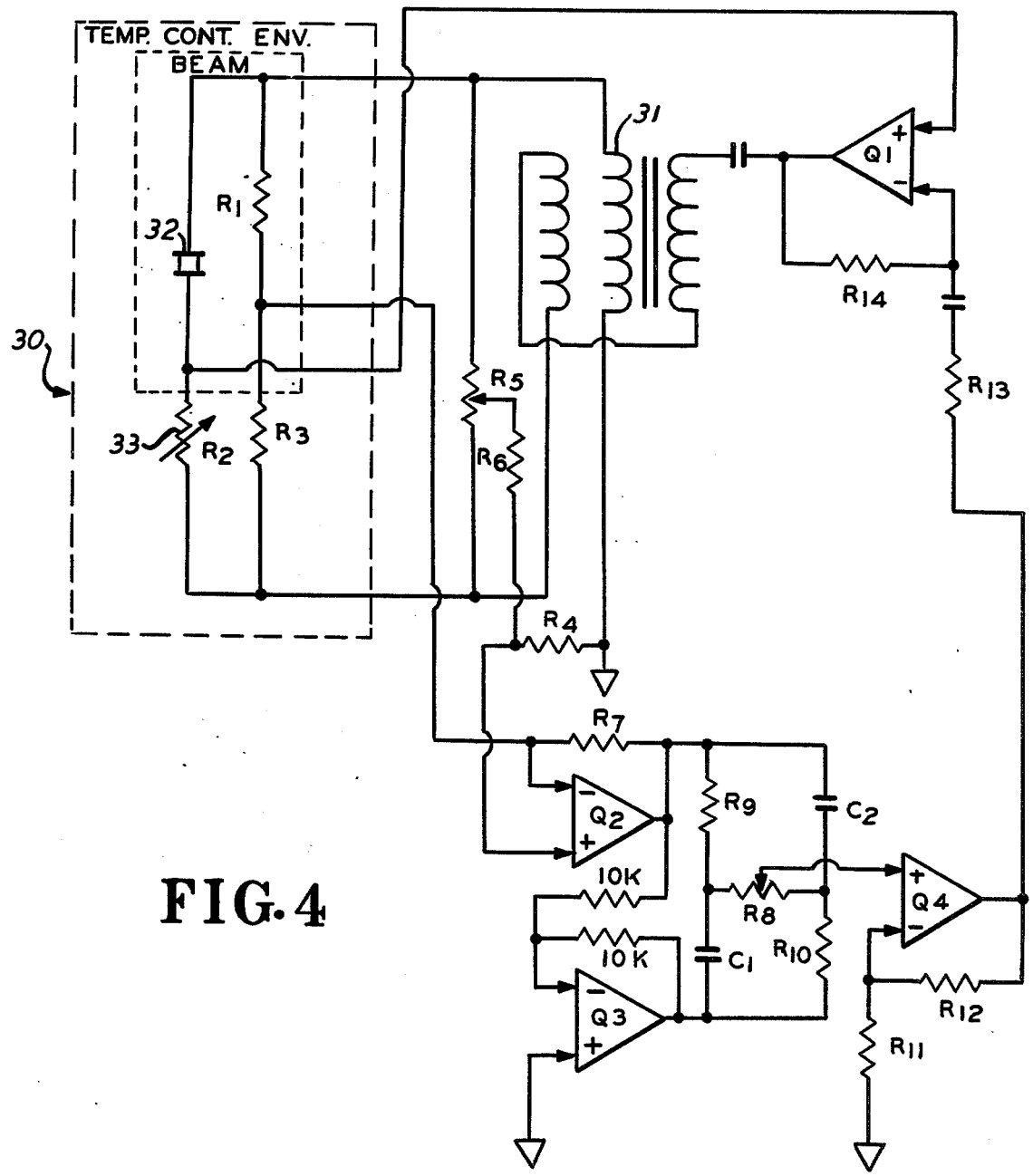
FIG. 4 is a schematic diagram showing the circuit designed to achieve the temperature compensated vibrating beam accelerometer of the invention.

Referring to FIG. 4, the circuitry capable of achieving the objectives of the invention is shown for one quartz beam, it being understood that a similar circuit is provided for the other quartz beam. The accelerometer of the present invention which is configured in a manner similar to FIG. 1 is driven by a bridge type oscillator shown generally at 30. One leg of the bridge is a center tapped bi-filar transformer 31 rather than existing bridge resistor. In a first bridge leg is the quartz beam 32 and the amplitude limiting resistor 33, shown here as an incandescent lamp. The voltage from the output amplifier is applied in push-pull by the grounded center tap bi-filar transformer. Quartz beam 32 behaves as a series resonant circuit (with stray shunt capacitance). As resonance is approached by increasing the frequency from a low value, its impedance becomes low and changes from capacitive to inductive as the frequency increases from below resonance to above resonance. At resonance, the phase shift is 0°, and oscillation occurs at that frequency. As the amplitude of oscillation increases, the voltage across the amplitude control resistor 33 increases causing its resistance to increase and reducing the gain of the feedback loop. The resultant signal is fed to the oscillator amplifier as an error signal and produces the power to drive the bridge. Gain of the power drive amplifier is controlled by a feedback network. $R_1$ and $R_3$ in the second leg of bridge circuit 30 serve to sense the temperature of quartz beam 32. $R_1$ is the temperature sensing film resistor on quartz beam 32 and $R_3$ is the reference resistor for $R_1$. Trimming of the null point of the temperature compensator is accomplished by means of potentiometer $R_5$, which is placed across the output of the bi-filar transformer. The signal from the bi-filar winding adds a signal to the input of transistor Q2, aiding or opposing the signal applied by the temperature sensing leg of the bridge.

The output of Q2 is phase inverted by Q3. Q2 and Q3 drive an opposed second bridge consisting of an RC network. The center points of the RC bridge are out-of-phase with respect to each other and in quadrature with respect to the basic oscillator phase. The values of R and C are chosen to have equal impedances at the operating frequency, resulting in a quadrature signal equal in amplitude to the drive signal. A potentiometer R8 having a resistance which is high compared to R10, is applied between the midpoint of this bridge to provide an amplitude adjustable signal of 90° or 270° phase for temperature coefficient adjustment. This signal is amplified by Q4 and applied to the oscillator (Q1) input.

The effect of the circuitry of FIG. 4 is to apply a quadrature signal (90° or 270° with respect to the oscillator output) to the oscillator input in a manner so as to be summed with the quartz beam leg input of the sensing bridge. This signal causes the instrument to oscillate at a frequency other than the frequency at which the phase shift through the quartz leg is zero degrees. The temperature at which a null quadrature signal is achieved is adjusted over a small range by an external potentiometer R5 which forms an additional bridge input to Q2. Compensation for the temperature coefficient of the quartz beam is provided by adjustment of potentiometer R8. It is necessary that the temperature coefficient of the quartz beam be essentially uniform over the operating temperature range.

While the present invention has been shown in the preferred embodiments, it will be obvious to those skilled in the art that various modifications can be made therein within the scope of the invention, and it is intended that the appended claims cover all such modifications.

What is claimed is:

1. A vibrating beam accelerometer comprising:
    a bridge circuit comprising a vibrating member and a frequency amplitude limiting means in a first leg of said bridge circuit said vibrating member undergoing a frequency shift from resonance due to temperature uncertainties,
    said bridge circuit further comprising temperature sensing means and a reference resistor in a second leg of said bridge circuit said temperature sensing means sensing a temperature change in said vibrating member causing the frequency of oscillation of said vibrating member to shift and developing an error signal indicative of said frequency shift, and
    means responsive to said error signal for adjusting the oscillation of said vibrating member so that it maintains a constant phase differential between its input and output.

2. The vibrating beam accelerometer of claim 1 comprising:
    a transformer for providing input signals to said bridge circuit containing said vibrating member,
    means for comparing said input signals to said vibrating member with said error signals, and
    means for adjusting the frequency of the input signal to said comparing means.

3. The vibrating beam accelerometer of claim 2 comprising:
    means for inverting the polarity of the signal from said comparing means, and
    a second bridge circuit responsive to said signal from said signal inverting means for providing a signal having a predetermined phase component for compensating for the frequency shift of said vibrating member accelerometer caused by temperature uncertainties.

4. The vibrating beam accelerometer of claim 3 comprising:
    means for amplifying said signal from said second bridge circuit, and
    means for applying said amplified signal to said transformer connected to said vibrating member.

5. The vibrating beam accelerometer of claim 4 comprising:
    means for adjusting the temperature null point.

6. A vibrating beam accelerometer comprising:
    a vibrating member, means for sensing a temperature change in said vibrating member said temperature change causing a frequency shift in said vibrating member which is smaller than the "Q" of said vibrating member, means responsive to said temperature responsive means for providing a signal having a predetermined phase component representative of said frequency shift, and means responsive to said signal for generating a quadrature signal of a predetermined amplitude for application to said vibrating member, whereby the frequency of said vibrating member is adjusted to compensate for said frequency shift.

7. A vibrating beam accelerometer comprising:

a vibrating member mounted to sense acceleration along its input axis, a first bridge circuit comprising said vibrating member and an amplitude limiting means in a first leg of said bridge and a temperature sensing means and reference resistor in a second leg of said first bridge circuit said temperature sensing means providing a signal having a phase component representative of the frequency shift caused by a temperature change in said vibrating member, means for deriving a signal by comparing the input and output signals of said vibrating member, and a second bridge circuit responsive to said comparing means for generating a quadrature signal for input to said vibrating member, whereby the frequency of said vibrating member is adjusted to compensate for said frequency shift.

* * * * *